M. SUBERT.
SHIPPING CRATE.
APPLICATION FILED FEB. 20, 1914.
1,106,011.
Patented Aug. 4, 1914.
2 SHEETS—SHEET 1.
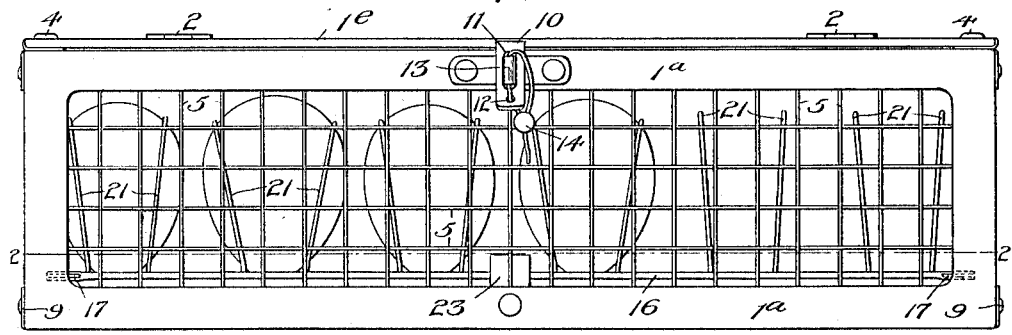
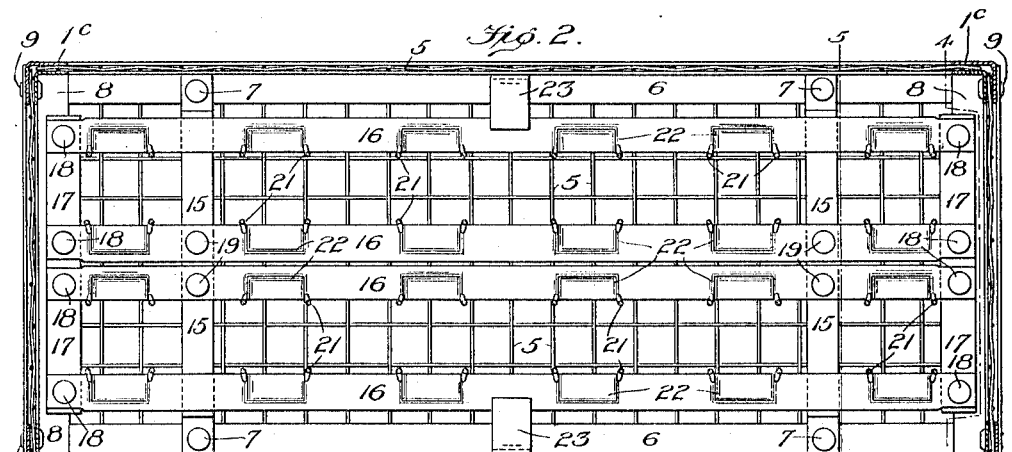
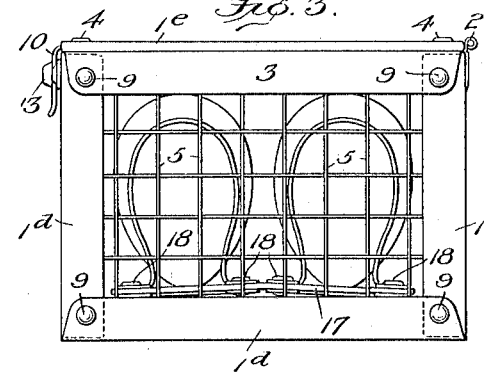
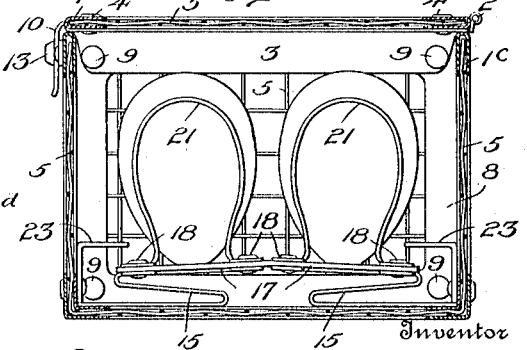
Witnesses
Edwin L. Bradford
M. D. Ballauf
Inventor
Max Subert
By Wm. E. Dyre,
Attorney M. SUBERT.
SHIPPING CRATE.
APPLICATION FILED FEB. 20, 1914.
1,106,011. Patented Aug. 4, 1914.
2 SHEETS—SHEET 2.
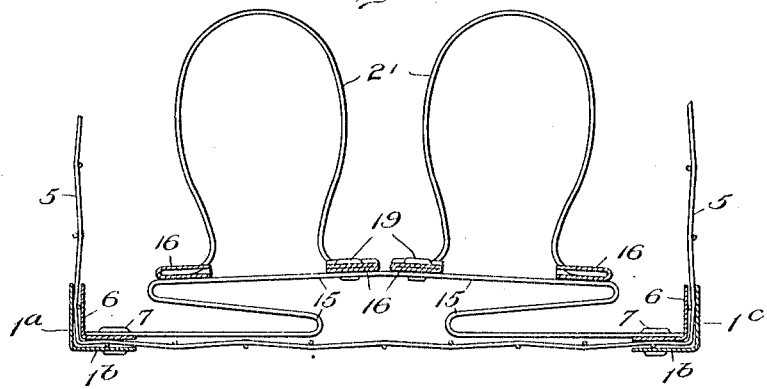
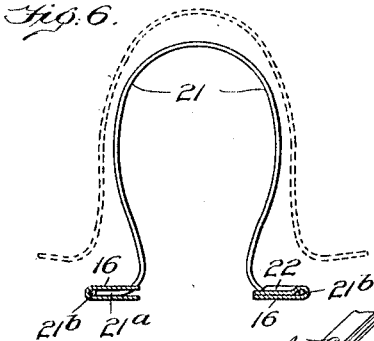
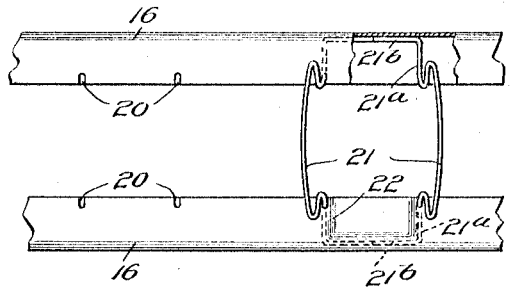
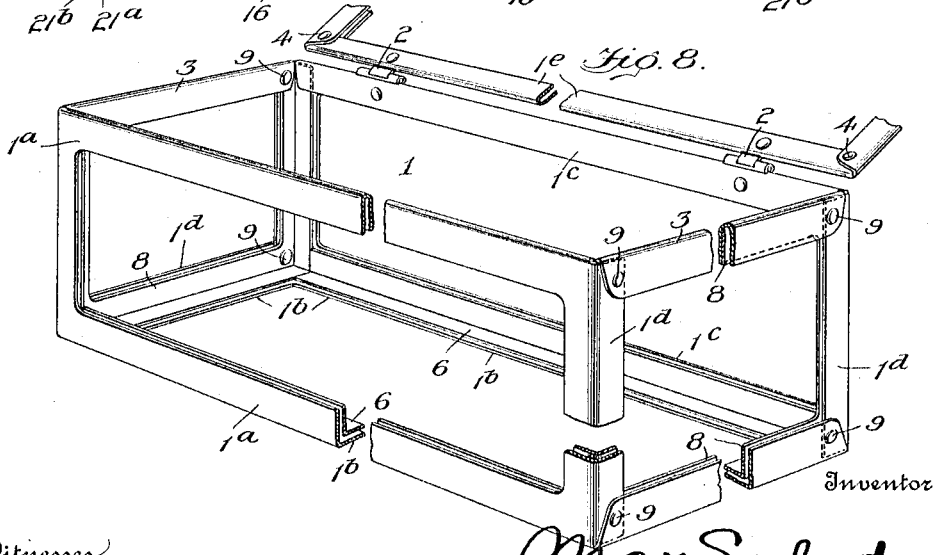
Witnesses
Edwin L. Bradford
M. D. Ballauf
Inventor
Max Subert,
By Wm. E. Dyre,
Attorney

UNITED STATES PATENT OFFICE.

MAX SUBERT, OF NEW YORK, N. Y., ASSIGNOR TO FARM PRODUCTS DISTRIBUTING COMPANY, OF NEW YORK, N. Y., A CORPORATION OF NEW YORK.

SHIPPING-CRATE.

1,106,011.   Specification of Letters Patent.   Patented Aug. 4, 1914.

Application filed February 20, 1914. Serial No. 819,985.

*To all whom it may concern:*

Be it known that I, MAX SUBERT, a citizen of the United States, residing at New York, in the county of New York and State of New York, have invented certain new and useful Improvements in Shipping-Crates; and I do hereby declare the following to be a full, clear, and exact description of the invention, such as will enable others skilled in the art to which it appertains to make and use the same.

My invention relates to egg receptacles or shipping crates for the transportation of eggs, and has for an object primarily the protection of eggs from breakage while in the course of transportation.

It has for a further object the production of light, durable, all-metal crates equipped with individual egg holders yieldingly mounted in a manner to absorb shocks from all directions, and to prevent within-contained eggs from contacting either with themselves, or with any portion of the inclosing crate while in transit between the poultry farmer and the consumer, or elsewhere.

The invention also contemplates the production of thoroughly ventilated open crates, for the purposes stated, which are easily cleaned and kept clean, but which at the same time may be closed and sealed to prevent unauthorized handling of the contents.

My present invention has for a further object certain improvements upon the structure represented by Letters Patent of the United States No. 1,009,451, issued to me under date of November 21, 1911.

With the foregoing and other objects and advantages in view, the present invention will be hereinafter particularly described and pointed out in the claims following.

In the accompanying drawings which form part of this application for Letters Patent, and whereon like numerals refer to corresponding parts wherever they occur in the several views:

Figure 1 is a side elevation of a shipping crate, having its lid sealed in a closed position, and showing several eggs vertically supported in individual holders. Fig. 2 is a horizontal section just above the bottom of the crate on the line 2—2, Fig. 1. Fig. 3 is an end view of the crate also showing two eggs in position. Fig. 4 is a transverse sectional view of the invention taken on the line 4—4, Fig. 2, but, like Fig. 3, showing two eggs in position. Fig. 5 is a full size fragmentary sectional view on the line 5—5, Fig. 2. Fig. 6 is a side elevation of one of each pair of wires constituting individual egg holders, shown open in dotted lines, and then by full lines partially closed in operative position. Fig. 7 is a view showing in plan one pair of individual egg holders, and fragments of oppositely disposed supporting frame members, and Fig. 8 is a perspective view on a relatively reduced scale, of the receptacle frame and a portion of the lid hinged thereto.

Reference being had to the drawings and numerals thereon, 1 represents the frame of the invention made of sheet metal preferably terne-plate suitably reinforced or stiffened, as will later appear, and comprising the following rectangular members: a front $1^a$, bottom $1^b$, back $1^c$, ends $1^d$, $1^d$, and a lid or cover $1^e$ hinged to back $1^c$ as at 2, 2, all of skeleton form. By preference the said front, bottom, back, and, with the exception of top rails 3, both ends of the frame 1, are made from a unitary piece of material folded and angled upon itself in a manner to insure great rigidity and speed of construction. While, as shown by Fig. 8, the top end or transverse rails 3, 3 aforesaid, are in the present instance formed separately, of inverted U-shape, and are riveted to transverse flanges of the front and back members which they connect. The lid or cover $1^e$ is also by preference stamped from a unitary piece of metal, is folded upon itself at all four edges to stiffen it, and is finished by having its four corners riveted through as at 4. Within the frame thus outlined is rigidly secured a woven wire inclosing fabric 5, which, as shown by Fig. 4, has its beginning between the double thickness of material forming the top rail of the frame front $1^a$, and, passing thence downward, angles across bottom $1^b$, and up back $1^c$ terminating between the double thickness of material forming the top rail of said back member. In like manner rectangular sections of the same material 5, cut to fit are placed within each end $1^d$, whereupon all portions of the fabric are finally secured by means of longitudinal angle plates 6, 6 extending from end to end of the structure at its lower corners where it is fastened securely by rivets 7, 7 to the frame bottom 1ᵇ; and by means of reinforcing end-plates 8, 8, which also are similarly angled at their respective bases, but in addition are stiffened by vertical flanges forming corner angles, as best shown in section by Fig. 8, and moreover are connected above by a single thickness of the material which crosses under cover of the U-shaped end rails 3, 3. Rivets 9, 9, above and below at both ends of the structure are then employed to secure all of the end members aforesaid together.

To complete the inclosure a rectangular sheet of like fabric 5 is finally received between the folded edges of lid or cover 1ᵉ, where it is firmly crimped and secured by agency of the corner rivets 4, hereinbefore mentioned. And as the means of fastening said lid or cover there is provided at its front center, as shown by Figs. 1, 3 and 4, a suitable clasp 10 perforated by an elongated opening 11, and in alinement therewith a second small perforation 12; while secured to the face of the frame member 1ᵃ is a projecting eye 13 adapted to enter and pass through said opening 11 when the receptacle lid is closed, there to be secured by means of a wire and seal 14, as shown by Fig. 1, or by any suitable locking means. And it will be noted that the hasp thus formed is practically a spring hasp, because of the natural and very effective yielding action of the upper rail of front 1ᵃ to permit passage of clasp 10 over its eye or keeper 13 when closed down.

Within the inclosing receptacle constructed substantially as aforesaid are positioned a pair of specially constructed leaf springs 15, 15, which cross the frame bottom 1ᵇ transversely from side to side and are firmly secured in parallel arrangement near opposite ends of the structure by agency of the rivets 7, 7, before mentioned. These springs, as best shown by Figs. 2 and 5, are counterparts one of the other, and each extends horizontally inward from their opposite points of attachment 7, 7 to a point approximating the center of the structure, whence they are doubled upon themselves loosely in the same vertical plane, to approximately opposite sides of the structure, and are thereupon again and finally folded upon themselves always in a common vertical plane, to complete the spring and bridge the intervening space.

Resting directly upon the uppermost convolute of both plicated springs 15, 15 is a rectangular rack or egg-supporting tray, of skeleton form, consisting of parallel longitudinal two-ply bars 16 each made of sheet metal loosely folded once upon itself, and arranged in pairs having their open edges oppositely disposed or facing, as shown by Fig. 7. At opposite ends both pairs of the said longitudinal bars 16, 16 are connected by transverse space-bars 17, 17 riveted to all of said two-ply bars 16 by rivets 18, 18, and each provided with a slight upward camber as shown by Figs. 3 and 4, for purposes later to appear. The rectangular rack or egg-supporting tray thus constructed is secured to its supporting springs 15, 15, by means of central rivets 19, 19, thereby affording a slight rocking and a universal vibratory action of the tray.

The upper surface or fold of each pair of the two-ply longitudinal bars 16 at predetermined and regular intervals is slightly indented or slotted as at 20, and into corresponding or opposite slots 20, 20, are sprung the opposite lower ends of spring wire loops 21. These loops 21, by preference of piano wire, each have outwardly disposed horizontal base extensions 21ᵃ which terminate in a bend 21ᵇ at right angles to the plane of the loop. In assembling the said loops 21 in pairs to coöperate in forming individual egg supports, they are first compressed from the shape indicated by dotted lines in Fig. 6, to points slightly beyond that indicated by full lines, whereupon they are permitted to expand as their extensions 21ᵃ and 21ᵇ enter between the folds of opposite longitudinal bars 16, as shown at the left side of said Fig. 6 and at the top of Fig. 7. Having assumed this position with angular bend 21ᵇ resting against the curved back of plate 16 the operation is completed by crimping the metal of plates 16 between each pair of loops 21 as shown at 22 bottom of Fig. 7, and at the right side of Fig. 6. This crimping operation not only quickly secures the loops 21 in place, but as securely retains them in coöperating pairs, and also causes the loops of each pair to diverge slightly in an upward direction, thereby facilitating the introduction of eggs thereinto.

At two or more points, as shown at the center of Figs. 1 and 2, there is provided a relatively fixed stop 23, 23, consisting of a small angle plate riveted to the front 1ᵃ and back 1ᶜ of the receptacle frame, and overhanging the outer longitudinal bars 16, 16 of the egg-supporting tray, as a precautionary measure to limit the upward movement of said tray and its contents under an unusual shock.

Having thus described the structural arrangement of my invention, its use and operation are quite apparent and need not be herein dwelt upon. It may be noted, however, that the peculiarly balanced arrangement of supporting springs 15, secured at their centers only to the egg-supporting tray, and the resiliency of the individual wire loops 21 operating in pairs as individual egg supports or holders, combine and coöperate in a most effective manner to absorb all shocks to which the crate may be sub- jected, and protect its contents from breakage. Moreover, it is desirable to introduce eggs into their individual egg holders point down, and for this reason it will be particularly noted that the space bars 17, and as a consequence the entire surface of the egg-supporting tray is afforded a slight upward camber, thereby affording greater clearance between the upper ends of the eggs and avoiding the possibility of accidental engagement.

Having thus described my invention in its best form of construction at present known to me, it will be apparent to persons skilled in the art to which my improvements relate, that various changes and modified features of construction may be made and substituted for those shown and described without materially departing from the scope of my invention.

What I now claim, therefore, and desire to secure by Letters Patent is:

1. In a receptacle for the shipment of eggs a within-contained egg-supporting tray comprising two-ply bars spaced apart and arranged in pairs, in combination with a plurality of wire loops also arranged in coacting pairs having angular base extensions crimped into position between the plies of each of said bars said loops constituting individual egg holders.

2. In a receptacle for the shipment of eggs a within-contained egg-supporting tray comprising two-ply sheet metal bars spaced apart and arranged in pairs, in combination with a plurality of spring wire loops also arranged in coacting pairs having oppositely disposed base extensions at an angle to the plane of said loop and crimped into position between the plies of each of said bars.

3. In a receptacle for the shipment of eggs a within-contained egg-supporting tray comprising a plurality of two-ply sheet metal bars spaced apart and arranged in pairs, in combination with upwardly cambered space-bars connecting said sheet metal bars, and a plurality of wire loops also arranged in coacting pairs each loop having angular base extensions crimped into position between the plies of both sheet metal bars of each pair.

4. In a receptacle for the shipment of eggs a within-contained egg-supporting tray comprising two-ply bars spaced apart and arranged in pairs, in combination with a plurality of wire loops also arranged in coacting pairs each loop having angular base extensions crimped into position between the plies of both sheet metal bars of each pair, and springs interposed between said egg-supporting tray and the bottom of the egg receptacle.

5. In a receptacle for the shipment of eggs a within-contained egg-supporting tray comprising longitudinally arranged two-ply bars spaced apart and arranged in pairs upon opposite sides of the longitudinal center of the receptacle, in combination with upwardly cambered space-bars connecting said longitudinal bars, a plurality of wire loops also arranged in coacting pairs each loop having angular base extensions crimped into position between the plies of both sheet metal bars of each pair, and shock absorbing springs secured to the underside of said tray at approximately its longitudinal center.

6. In a receptacle for the shipment of eggs a within-contained egg-supporting tray comprising longitudinally arranged bars spaced apart and arranged in pairs upon opposite sides of the longitudinal center of the receptacle, in combination with individual egg holders surmounting said tray, and transverse shock absorbing springs secured at their ends to opposite sides of the receptacle and at approximately their centers to the underside of said supporting tray.

7. In a receptacle for the shipment of eggs a within-contained egg-supporting tray, in combination with individual egg holders surmounting said tray, and transversely arranged plicated shock absorbing springs secured at their ends to opposite sides of the receptacle and at approximately their centers to the underside of said supporting tray.

8. In a receptacle for the shipment of eggs a within-contained egg-supporting tray of skeleton form, in combination with individual egg holders surmounting said tray, transversely arranged plicated shock absorbing springs secured at their ends to opposite sides of the receptacle and at approximately their centers to the underside of said supporting tray, and relatively fixed stops located in the path of said tray to limit its upward movement.

In testimony whereof I affix my signature, in presence of two subscribing witnesses.

MAX SUBERT.

Witnesses:
E. J. MURPHY,
F. W. GILES, Jr.

Copies of this patent may be obtained for five cents each, by addressing the "Commissioner of Patents, Washington, D. C."